(12) United States Patent
Kida et al.

(10) Patent No.: US 12,461,623 B2
(45) Date of Patent: Nov. 4, 2025

(54) TOUCH PANEL SYSTEM AND ELECTRONIC DEVICE (71) Applicant: Sharp Display Technology Corporation, Mie (JP)

(72) Inventors: Kazutoshi Kida, Kameyama (JP); Yasuhiro Sugita, Kameyama (JP); Takenori Maruyama, Kameyama (JP); Takuma Yamamoto, Kameyama (JP); Shinji Yamagishi, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 18/890,905

(22) Filed: Sep. 20, 2024

(65) Prior Publication Data
US 2025/0138663 A1 May 1, 2025

(30) Foreign Application Priority Data

Oct. 25, 2023 (JP) .................................. 2023-183583

(51) Int. Cl.
G06F 3/044 (2006.01)
G02F 1/1333 (2006.01)
G02F 1/1343 (2006.01)
G02F 1/1362 (2006.01)
G06F 3/041 (2006.01)

(52) U.S. Cl.
CPC ........ *G06F 3/0416* (2013.01); *G02F 1/13338* (2013.01); *G02F 1/13439* (2013.01); *G02F 1/136209* (2013.01); *G02F 1/136222* (2021.01); *G06F 3/0412* (2013.01);
(Continued)

(58) Field of Classification Search
CPC ............ G02F 1/13338; G02F 1/13439; G02F 1/136209; G02F 1/136222; G06F 3/0412; G06F 3/0416; G06F 3/04164; G06F 3/044; G06F 3/0446; G06F 2203/04105; G06F 3/0414; G06F 3/0443
See application file for complete search history.

(56) References Cited

U.S. PATENT DOCUMENTS

2016/0062504 A1 3/2016 Hwang et al.
2017/0045988 A1* 2/2017 Sugita ................... G06F 3/0446
(Continued)

FOREIGN PATENT DOCUMENTS

JP 2017199412 A 11/2017
WO WO-2017195339 A1 * 11/2017 ........... G02F 1/1333

Primary Examiner — Julie Anne Watko
(74) Attorney, Agent, or Firm — Keating & Bennett, LLP (57) ABSTRACT A touch panel system includes a touch panel and a controller. The touch panel includes an active matrix substrate, a color filter substrate, and a liquid crystal layer located between the active matrix substrate and the color filter substrate. The active matrix substrate includes a drive electrode and a detection electrode. The drive electrode and the detection electrode are disposed on a surface of the active matrix substrate which faces the liquid crystal layer. The color filter substrate includes a conductor. The conductor is disposed on a surface of the color filter substrate which faces the liquid crystal layer. The controller is configured to supply a drive signal to the drive electrode and obtain a signal value from the detection electrode and to detect a pressing force applied to the touch panel by an indicator, based on the signal value obtained from the detection electrode.

9 Claims, 11 Drawing Sheets (52) U.S. Cl.
CPC .......... *G06F 3/04164* (2019.05); *G06F 3/044* (2013.01); *G06F 2203/04105* (2013.01)

(56) References Cited

U.S. PATENT DOCUMENTS

2022/0050555 A1\* 2/2022 Maruyama ............ G06F 3/0446
2023/0060098 A1\* 2/2023 Nagata ................ G06F 3/04164

\* cited by examiner

TOUCH PANEL SYSTEM AND ELECTRONIC DEVICE

BACKGROUND

1. Field

The present disclosure relates to a touch panel system and an electronic device.

2. Description of the Related Art

Japanese Unexamined Patent Application Publication No. 2017-199412 discloses a touch sensing display device (touch panel) that detects a touch position and a pressing force. This touch sensing display device includes a color filter, plural first touch electrodes, plural second touch electrodes, and plural third touch electrodes. The first touch electrodes are used for sensing a touch force. The second and third touch electrodes are disposed separately from the first touch electrodes by the color filter and are used for sensing a touch position. In this touch sensing display device, an elastic dielectric layer made of a resin is disposed on the first touch electrodes. When a user touches the touch sensing display device with a finger, for example, the elastic dielectric layer is deformed to change the electrostatic capacitance between the finger, for example, and the first touch electrodes. The touch sensing display device senses the touch force based on a signal output from the first touch electrodes.

The above-described touch sensing display device detects a capacitance change resulting from the deformation of a resin. However, the capacitance change by the deformation of a resin is very small. With this touch sensing display device, therefore, a sufficient capacitance change may not be obtained. Additionally, in the touch sensing display device, the electrostatic capacitance is varied if the contact area of a finger pressing the touch sensing display device is changed. Hence, the touch sensing display device may be unable to detect a pressing force with high accuracy.

It is thus desirable to provide a touch panel system and a display device including the touch panel system that can detect a pressing force with high accuracy.

SUMMARY

According to an aspect of the disclosure, there is provided a touch panel system including a touch panel and a controller. The touch panel includes an active matrix substrate, a color filter substrate, and a liquid crystal layer located between the active matrix substrate and the color filter substrate. The active matrix substrate includes a drive electrode and a detection electrode. The drive electrode and the detection electrode are disposed on a surface of the active matrix substrate which faces the liquid crystal layer. The color filter substrate includes a conductor. The conductor is disposed on a surface of the color filter substrate which faces the liquid crystal layer. The controller is configured to supply a drive signal to the drive electrode and obtain a signal value from the detection electrode and to detect a pressing force applied to the touch panel by an indicator, based on the signal value obtained from the detection electrode.

DESCRIPTION OF THE EMBODIMENTS

The disclosure will be described below in detail through illustration of the following embodiments.

First Embodiment

Figure 1:
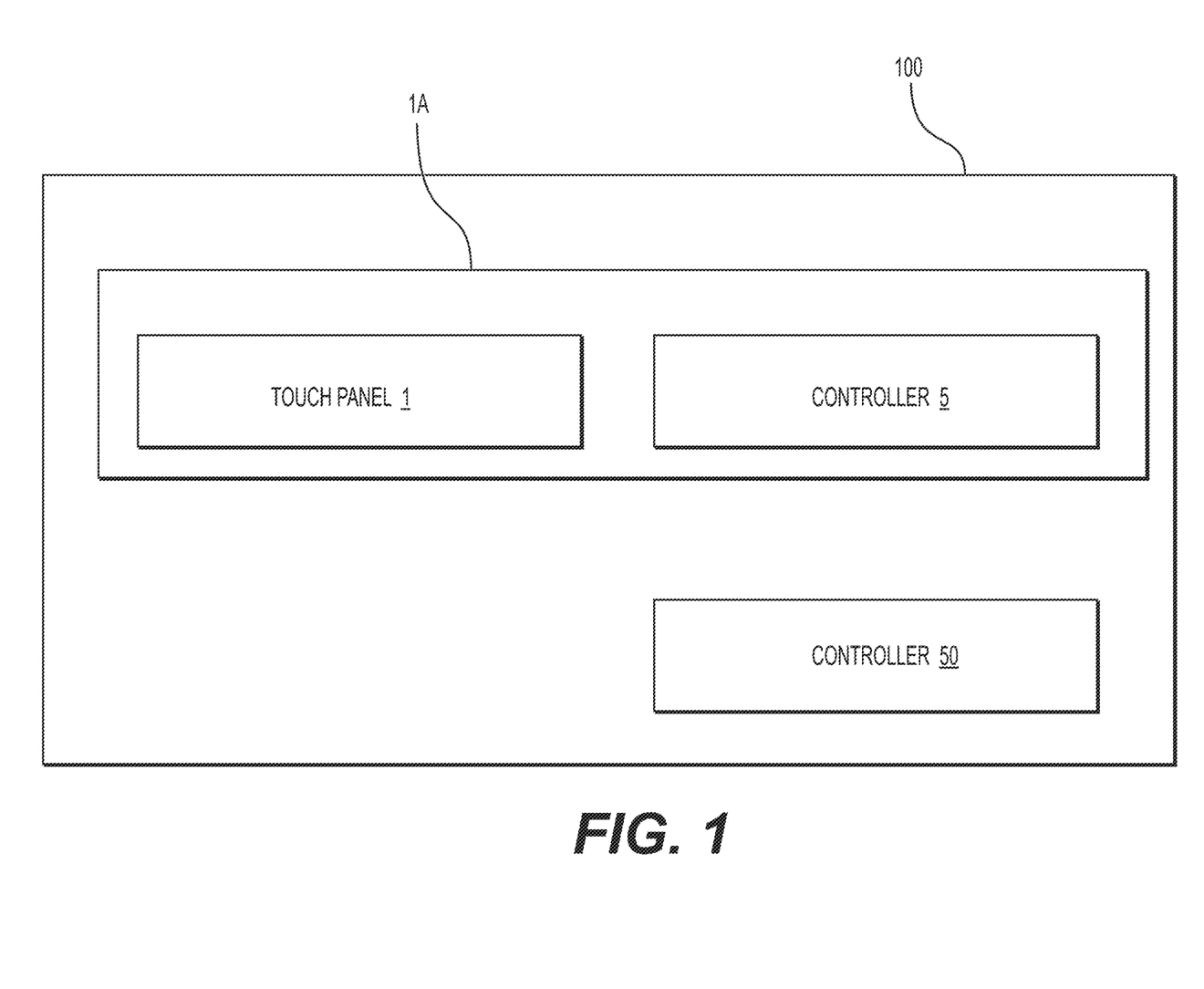
FIG. 1 is a schematic block diagram of an electronic device according to a first embodiment.

FIG. 1 is a schematic block diagram of an electronic device 100 according to a first embodiment. The electronic device 100 is a smartphone, a tablet terminal, a smartwatch, an in-vehicle information display, or a personal computer, for example. The electronic device 100 includes a touch panel system 1A and a controller 50. The controller 50 includes a processor, such as a central processing unit (CPU), and executes certain processing for the electronic device 100, based on a signal from the touch panel system 1A.

Figure 2:
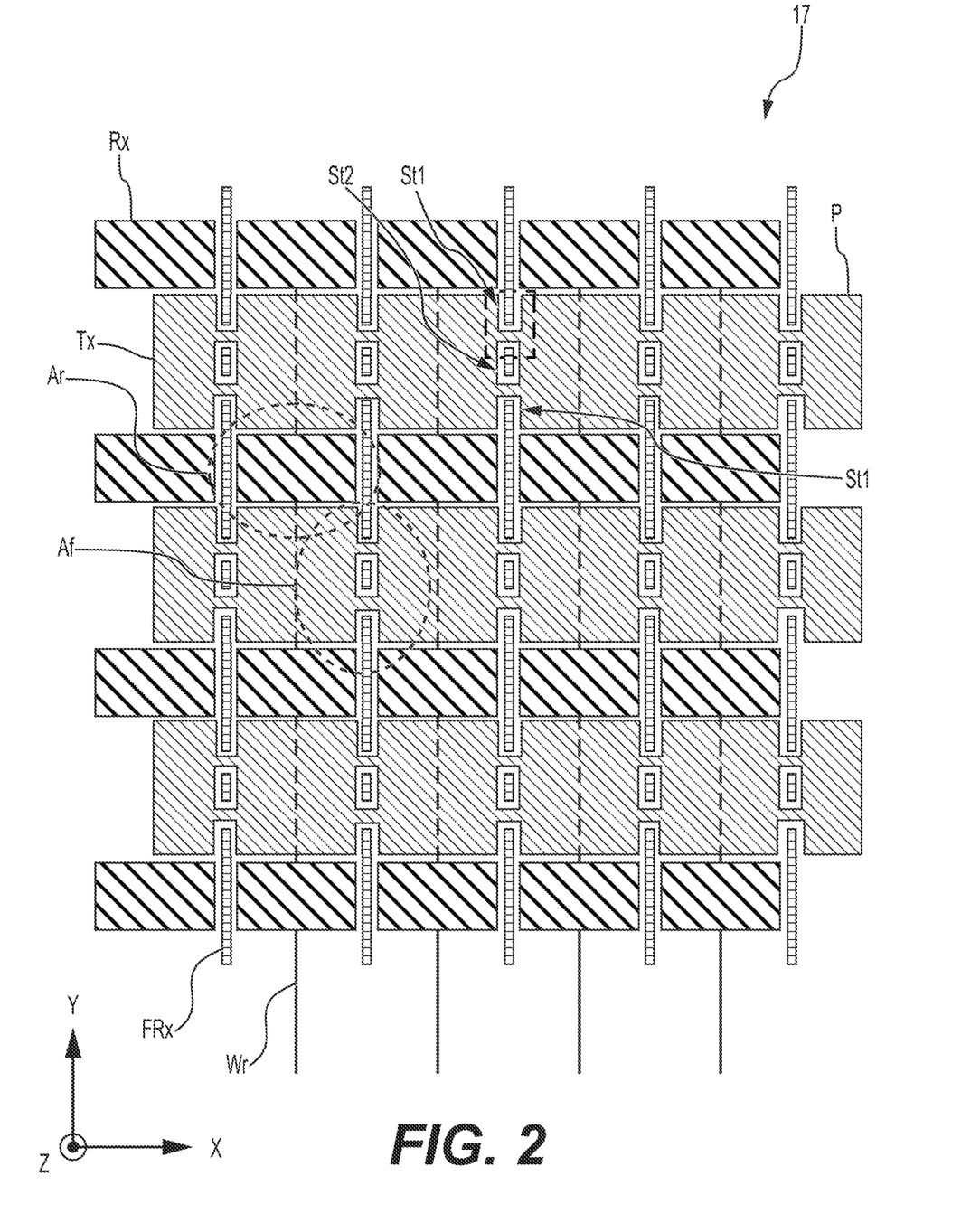
FIG. 2 is a schematic plan view of an electrode layer of a touch panel according to the first embodiment.
Figure 3:
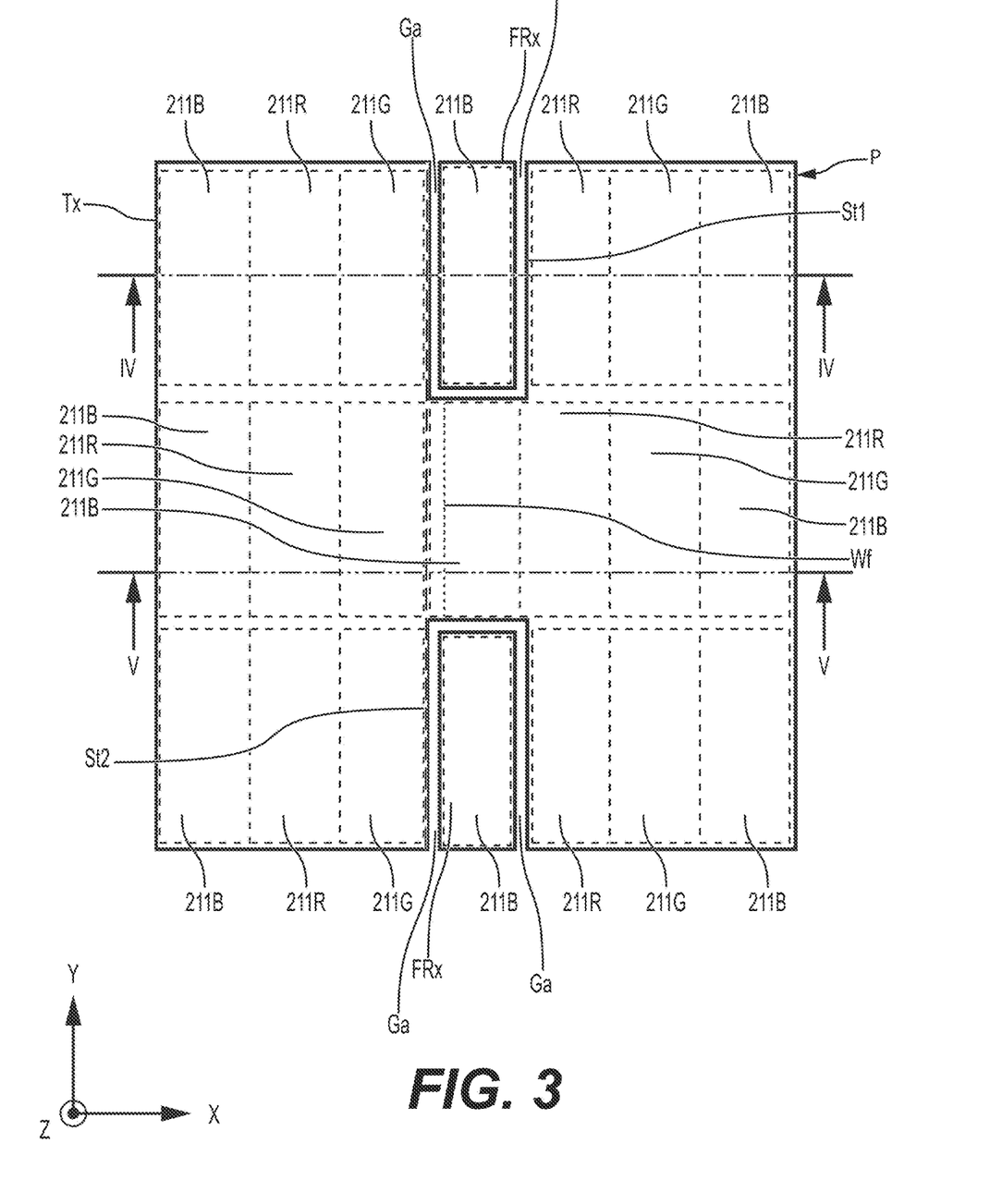
FIG. 3 is a schematic enlarged view of a portion P in FIG. 2.
Figure 4:
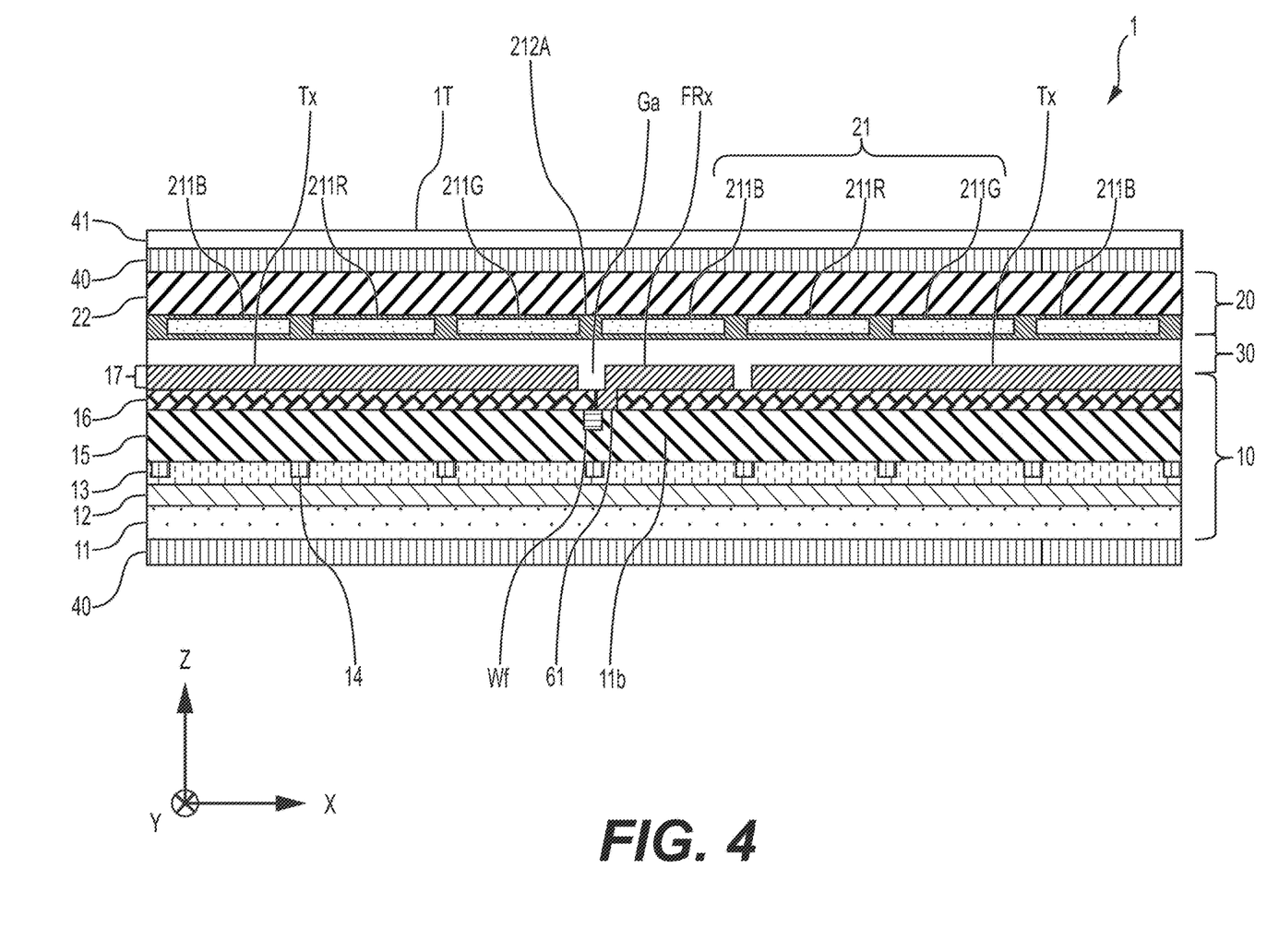
FIG. 4 is a schematic sectional view taken along line IV-IV in FIG. 3.
Figure 5:
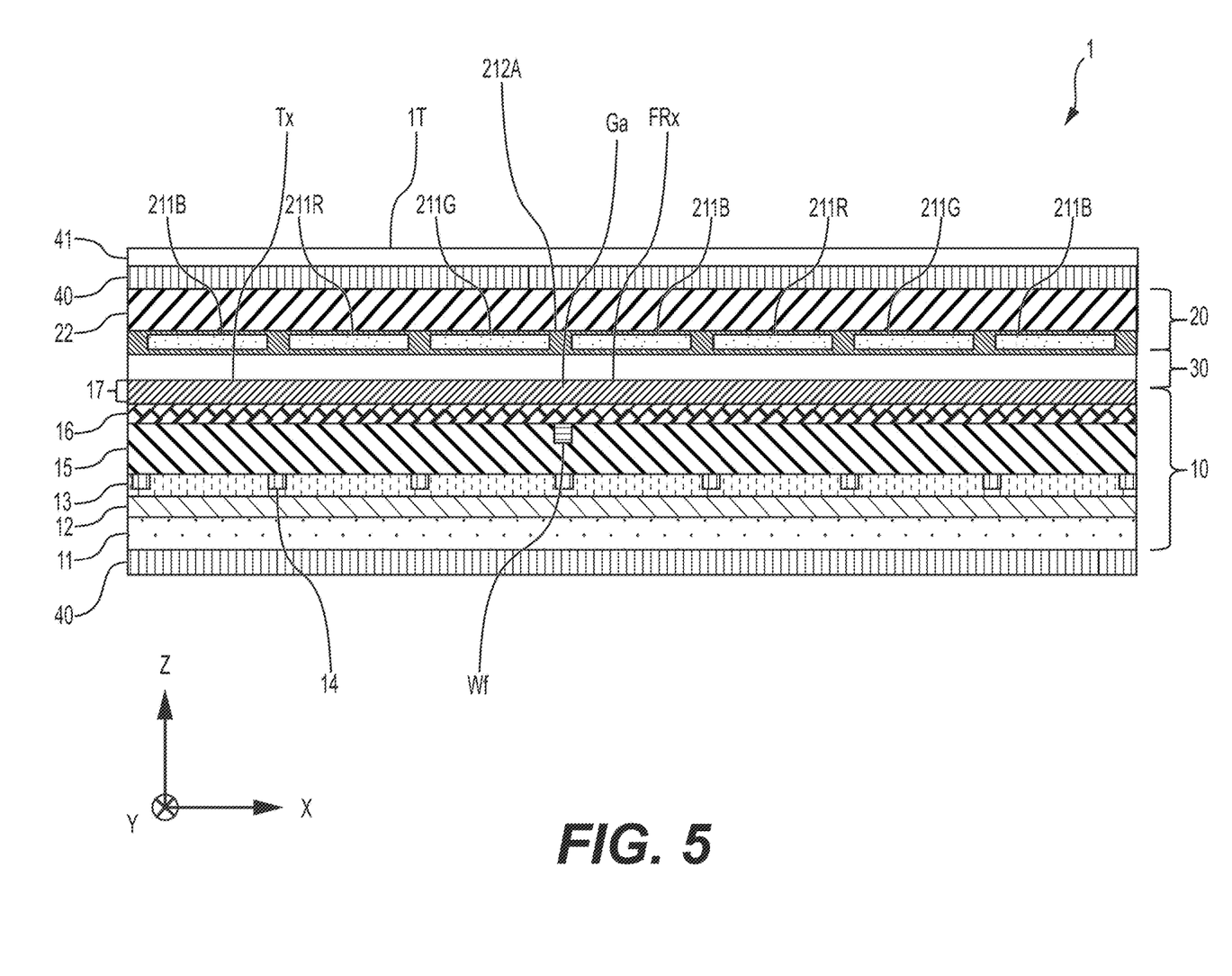
FIG. 5 is a schematic sectional view taken along line V-V in FIG. 3.

The touch panel system 1A includes a touch panel 1 and a controller 5. FIG. 2 is a schematic plan view of an electrode layer 17 including electrodes that detect the position of an indicator on the touch panel 1 and the pressing force applied to the touch panel 1. FIG. 3 is a schematic enlarged view of a portion P in FIG. 2. FIG. 4 is a schematic sectional view taken along line A-A in FIG. 3. FIG. 5 is a schematic sectional view taken along line B-B in FIG. 3.

The touch panel 1 is a full in-cell touch panel and is formed by integrating a capacitive touch panel into a liquid crystal panel. As shown in FIG. 4, the touch panel 1 includes an active matrix substrate 10, a color filter substrate (hereinafter called the CF substrate) 20, and a liquid crystal layer 30 disposed between the active matrix substrate 10 and the CF substrate 20. A pair of polarizers 40 are provided. More specifically, one polarizer 40 is disposed on the outer side of the active matrix substrate 10, while the other polarizer 40 is disposed on the outer side of the CF substrate 20. The thickness of the liquid crystal layer 30 (cell gap) is about 3 µm, for example.

The CF substrate 20 includes a glass substrate 22, a color filter 21, and black matrixes 212. The color filter 21 and the black matrixes 212 are disposed on the surface of the glass substrate 22 which faces the liquid crystal layer 30. The polarizer 40 is disposed on the opposite surface of the glass substrate 22. Cover glass 41 is disposed on the polarizer 40 and the surface of the cover glass 41 forms a touch surface 1T of the touch panel 1. The touch panel 1 receives an operation performed by an indicator F (see FIG. 6), such as a finger or a stylus pen.

The color filter 21 includes multiple resists of different colors, each of which is provided for a corresponding pixel. In the first embodiment, the color filter 21 includes color resists 211R, 211G, and 211B of red (R), green (G), and blue (B). The color resists 211R, 211G, and 211B will be collectively called color resists 211. The color resists 211 may have three or more colors.

Each black matrix 212 is located at a boundary between the corresponding color resists 211. In the first embodiment, each black matrix 212 is disposed between its adjacent color resists 211. That is, each color resist 211 is separated from the other color resists 211 by the corresponding black matrixes 212. The black matrixes 212 include at least one black matrix electrode (conductor) 212A. The black matrix electrode 212A is made of a material having conductivity and light-blocking properties, such as a metal, and is connected to a reference potential. The black matrix electrode 212A thus serves as a ground electrode and also as a black matrix. Some of the black matrixes 212 may be constituted by black matrix electrodes 212A or all the black matrixes 212 may be constituted by black matrix electrodes 212A.

Alternatively, the black matrixes 212 may include a black matrix layer made of a known black matrix material and a black matrix electrode 212A disposed on the black matrix layer.

The active matrix substrate 10 includes a glass substrate 11. The active matrix substrate 10 has a typical structure of a liquid crystal panel to apply an electric field to the liquid crystal layer 30 to drive the pixels. More specifically, the active matrix substrate 10 includes plural gate bus lines 12, plural source bus lines 14, plural switching elements (not shown), and plural pixel electrodes (not shown).

The gate bus lines 12 extend in the x-axis direction and are arranged in the y-axis direction.

The source bus lines 14 extend in the y-axis direction and are arranged in the x-axis direction. An insulating layer 13 is located between the gate bus lines 12 and the source bus lines 14. An insulating layer 15 is located between the pixel electrodes and the source bus lines 14.

An insulating layer 16 is disposed to cover the pixel electrodes, and the electrode layer 17 is located on the insulating layer 16. In the first embodiment, the electrode layer 17 includes electrodes which detect the position of an indicator on the touch panel 1 and the pressing force applied to the touch panel 1 and which also serve as a counter electrode or a common electrode. The counter electrode (common electrode) applies a voltage to the pixel electrodes and also applies an electric field to the liquid crystal of the liquid crystal layer 30. More specifically, as illustrated in FIG. 2, the electrode layer 17 includes plural drive electrodes Tx, plural position detection electrodes Rx, and plural pressing force detection electrodes FRx. For easy representation, these electrodes are indicated by the hatched portions in FIG. 2. The drive electrodes Tx, position detection electrodes Rx, and pressing force detection electrodes FRx are transparent electrodes, such as indium tin oxide (ITO) electrodes.

The drive electrodes Tx extend in the x-axis direction and are arranged in the y-axis direction. The position detection electrodes Rx are arranged two-dimensionally in the x-axis direction and the y-axis direction. More specifically, a row of multiple position detection electrodes Rx and one drive electrode Tx are alternately disposed in the y-axis direction.

With this arrangement, the drive electrode Tx is located between its adjacent position detection electrodes Rx in the y-axis direction.

The position detection electrodes Rx arranged in the y-axis direction are connected to each other by wiring Wr which is laid under the drive electrodes Tx via an insulating layer.

The pressing force detection electrodes FRx extend in the y-axis direction and are arranged in the x-axis direction. As shown in FIG. 2, each pressing force detection electrode FRx is disposed between the corresponding position detection electrodes Rx arranged in the x-axis direction and is divided at a position at which it overlaps the drive electrode Tx.

As illustrated in FIG. 3, in the first embodiment, the drive electrode Tx has two slits St1 and one slit St2 in a region where it intersects with the pressing force detection electrode FRx. The slits St1 are disposed on a pair of sides of the drive electrode Tx in the y-axis direction. More specifically, one slit St1 is disposed on one side of the drive electrode Tx in the y-axis direction, and the other slit St1 is disposed on the other side. The slits St1 are opened to the corresponding sides of the drive electrode Tx in the y-axis direction. The slit St2 is disposed separately from the above-described pair of sides and is located in the central portion of the drive electrode Tx in the y-axis direction. The slits St1 and St2 are arranged in the y-axis direction and are separated from each other in the y-axis direction. The slits St1 and the slit St2 are separated from each other so that the drive electrode Tx becomes continuous in the x-axis direction and is able to transmit a drive signal to the end of the drive electrode Tx.

The pressing force detection electrode FRx is disposed within the slits St1 and St2. Individual portions of the pressing force detection electrode FRx in the slits St1 and St2 are connected to each other by wiring Wf which is laid under the drive electrode Tx between the slits St1 and St2 via an insulating layer.

FIG. 3 also shows the correspondence between the pixels of the liquid crystal panel and the electrode layer 17. The color resists 211R, 211G, and 211B are indicated by the dotted lines in FIG. 3. Different colors of resists, such as the color resists 211R, 211G, and 211B, are repeatedly arranged in the x-axis direction in this order, and the same color of resists are arranged in the y-axis direction.

The width of the pressing force detection electrode FRx in the x-axis direction is about the same size as a pixel or a color resist, for example, in the x-axis direction.

A gap Ga is formed at a boundary region between the pressing force detection electrode FRx and the drive electrode Tx. As shown in FIG. 4, as viewed from above, the black matrix electrode 212A is located to overlap or match the gap Ga between the pressing force detection electrode FRx and the drive electrode Tx.

The drive electrodes Tx, position detection electrodes Rx, and pressing force detection electrodes FRx are connected to the controller 5. A drive signal is supplied from the controller 5 to the drive electrodes Tx. Detection signals output from the position detection electrodes Rx and the pressing force detection electrodes FRx are input into the controller 5.

The electronic device 100 can be manufactured by a typical manufacturing method using a manufacturing technology for a liquid crystal display or an in-cell touch panel.

Figure 6:
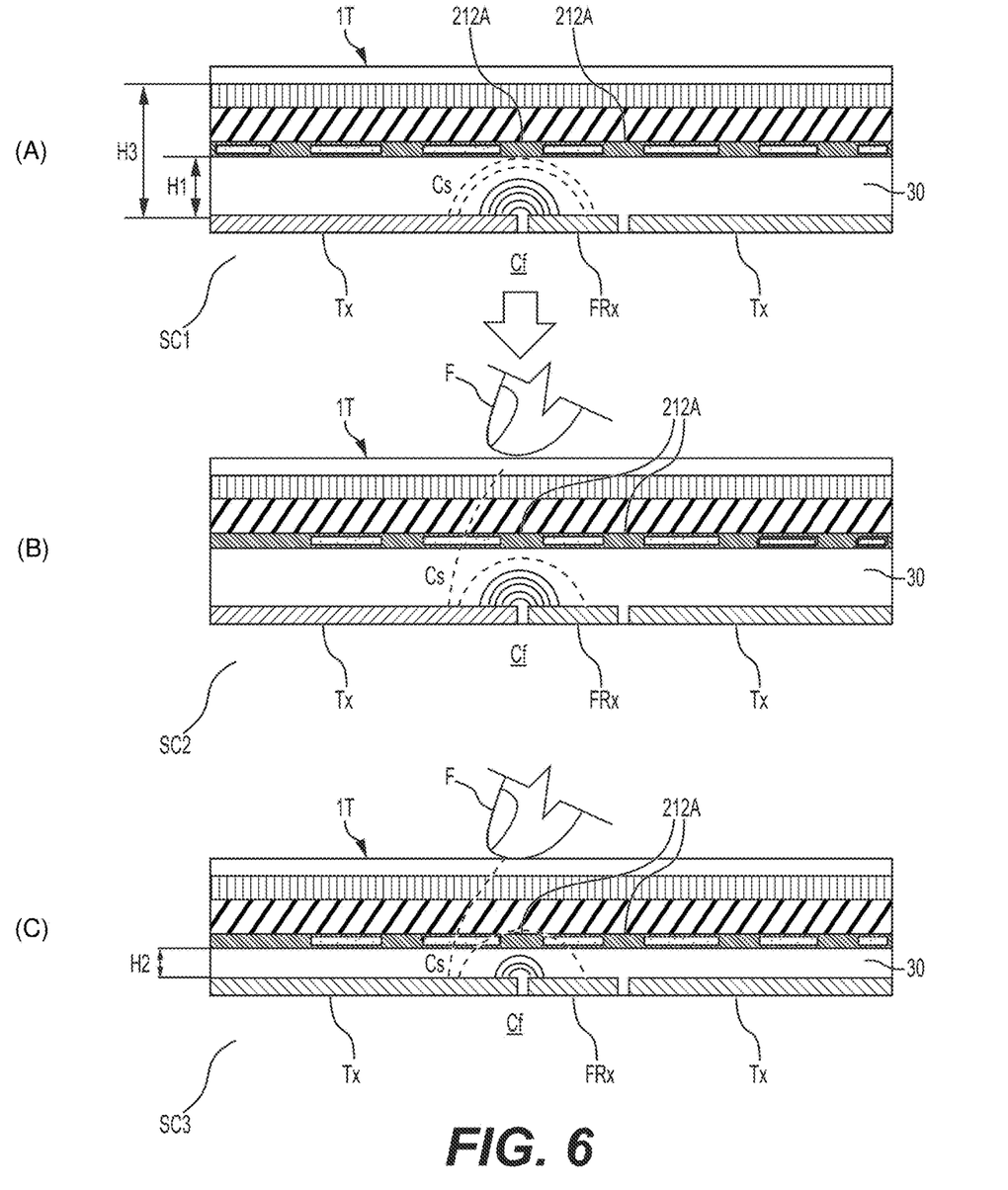
FIG. 6 shows schematic sectional views (A)-(C) for explaining the detection principle of a touch panel system according to the first embodiment.

FIG. 6 shows schematic sectional views (A)-(C) for explaining the detection principle of the touch panel system 1A according to the first embodiment. In (A), a scene SC1 represents a state in which an indicator F, such as a finger, has not yet touched the touch surface 1T of the touch panel 1 (before touching the touch surface 1T). In (B), a scene SC2 represents a state in which the indicator F is touching the touch surface 1T of the touch panel 1 but has not yet pressed it (before pressing the touch surface 1T). In (C), a scene SC3 represents a state in which the indicator F is pressing the touch surface 1T while keeping touching it (when pressing the touch surface 1T). A scene SC3 represents a state in which the indicator F is pressing the touch surface 1T while keeping touching it (when pressing the touch surface 1T).

In the touch panel 1, the drive electrodes Tx, position detection electrodes Rx, pressing force detection electrodes FRx face the black matrix electrodes 212A with the liquid crystal layer 30 therebetween. The black matrix electrode 212A is disposed to overlap the gap Ga as viewed from above. In the state in which the indicator F has not yet touched the touch surface 1T (scene SC1), fringe capacitance Cf is formed due to a fringe electric field near the region where the drive electrode Tx and the pressing force detection electrode FRx are disposed adjacent to each other. An electrostatic capacitance Cs is also formed between the surface of the drive electrode Tx and the surface of the pressing force detection electrode FRx. The electrostatic capacitance Cs is relatively small because of a small area of the pressing force detection electrode FRx. The signal value of a detection signal output from the pressing force detection electrode FRx is a value reflecting the electrostatic capacitance Cs and the fringe capacitance Cf.

After the indicator F touches the touch surface 1T but has not yet pressed it (scene SC2), the electrostatic capacitance Cs is decreased due to the transfer of electric charge to the indicator F, while the fringe capacitance Cf does not change considerably. The signal value of the detection signal output from the pressing force detection electrode FRx is changed due to a decrease in the electrostatic capacitance Cs.

When the indicator F is pressing the touch surface 1T (scene SC3), the thickness H1 of the liquid crystal layer 30 is decreased to the thickness H2 due to the pressing force of the indicator F. The black matrix electrode 212A connected to the reference potential is thus brought closer to the boundary region between the drive electrode Tx and the pressing force detection electrode FRx. This narrows the region where the fringe electric field is formed, thereby decreasing the fringe capacitance Cf. A change in the thickness of the liquid crystal layer 30 does not influence the electrostatic capacitance Cs. The signal value of the detection signal output from the pressing force detection electrode FRx is thus changed mainly due to a decrease in the fringe capacitance Cf.

Both in the scene SC2 and the scene SC3, the indicator F is touching the touch surface 1T, and there is only a small change in the electrostatic capacitance Cs. A difference in the amount of change $\Delta D(=DB-DA)$ between a signal value DA of the detection signal output from the pressing force detection electrode FRx in the scene SC2 and a signal value DB of the detection signal output from the pressing force detection electrode FRx in the scene SC3 is calculated. Then, the electrostatic capacitance Cs in the difference in the amount of change $\Delta D$ is found to be almost zero. The difference in the amount of change $\Delta D$ thus mainly reflects the fringe capacitance Cf changed by the pressing force of the indicator F. That is, the controller 5 calculates the magnitude of the pressing force based on the amount of change $\Delta D$ in the signal value.

The width of the pressing force detection electrode FRx in the x-axis direction is about the same size as a pixel in the x-axis direction and the electrode area is not large. Even if the contact area between the indicator F and the touch panel 1 is changed by the pressing force of the indicator F, there is relatively only a small change in the electrostatic capacitance Cs. The pressing force detection electrode FRx can thus detect the pressing force of the indicator F with high accuracy almost without being influenced by a change in the contact area between the indicator F and the touch panel 1.

In the scene SC1 in which the indicator F has not yet touched the touch surface 1T, the drive electrode Tx and the black matrix electrode 212A are capacitively coupled with each other, and the position detection electrode Rx and the black matrix electrode 212A are also capacitively coupled with each other. In the scene SC2 in which the indicator F has not yet pressed the touch surface 1T, the electrostatic capacitance between the drive electrode Tx and the black matrix electrode 212A and that between the position detection electrode Rx and the black matrix electrode 212A are also decreased due to the transfer of electric charge to the indicator F. The signal value of a detection signal output from the position detection electrode Rx reflects a change in the electrostatic capacitance resulting from the indicator F touching the touch surface 1T. The position of the indicator F touching the touch surface 1T can thus be determined based on the detection signal from the position detection electrode Rx.

The pressing force detection electrode FRx is disposed adjacent to the drive electrode Tx. Because of this arrangement, a smaller amount of electric charge is transferred from the capacitive coupling between the pressing force detection electrode FRx and the drive electrode Tx to the indicator F touching the touch surface 1T than the amount of electric charge from the capacitive coupling between the position detection electrode Rx, which is located farther separated from the drive electrode Tx than the pressing force detection electrode FRx is, and the drive electrode Tx to the indicator F. Since the pressing force detection electrode FRx is disposed adjacent to the drive electrode Tx, the signal value is less likely to be influenced by the indicator F touching the touch surface 1T.

Figure 7:
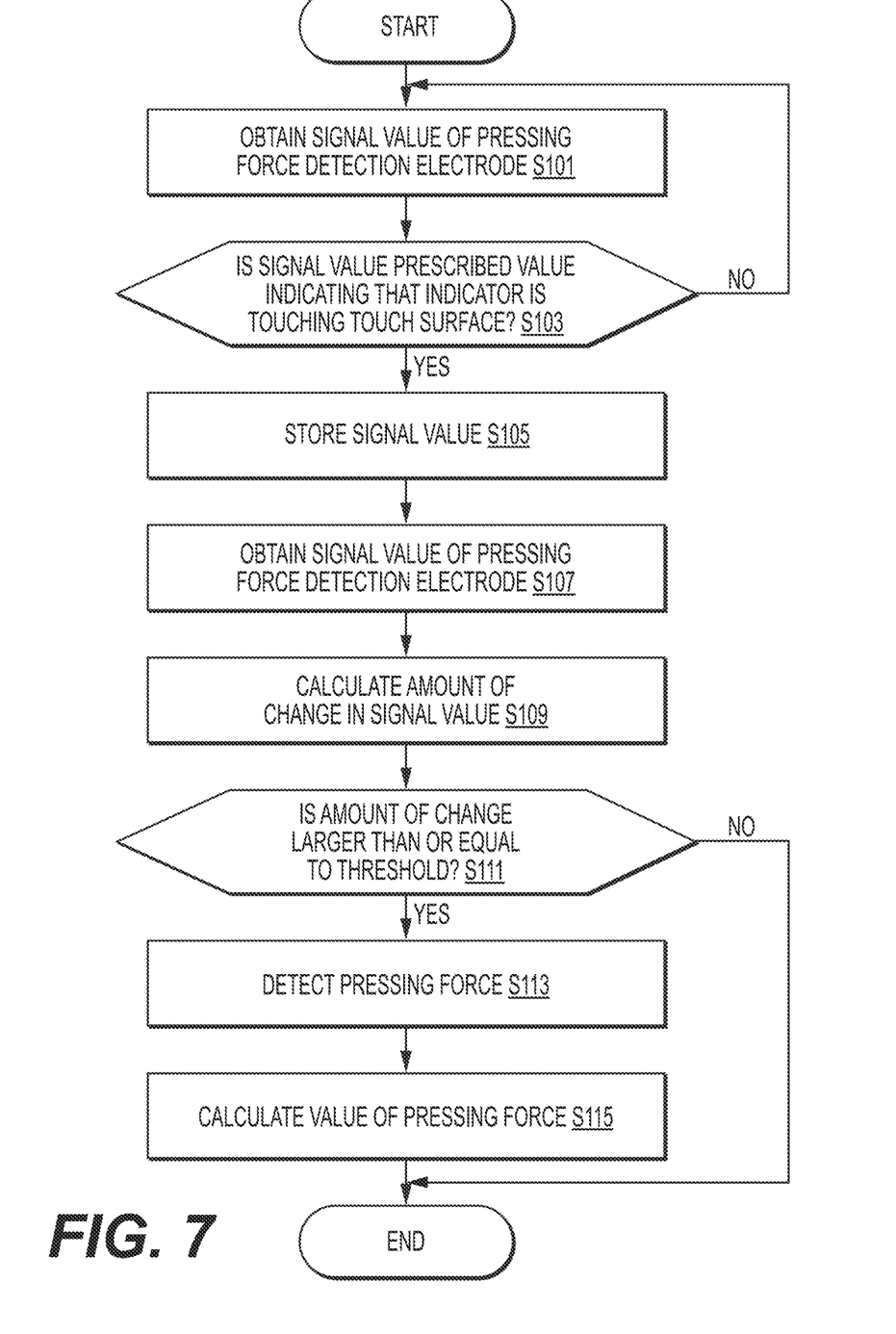
FIG. 7 is a flowchart illustrating an example of a detection method for a pressing force in the touch panel system.

FIG. 7 is a flowchart illustrating an example of a detection method for the pressing force in the touch panel system 1A.

In step S101, the controller 5 obtains the signal value from a detection signal output from the pressing force detection electrode FRx. If the signal value is a prescribed value indicating that the indicator F is touching the touch surface 1T (YES in step S103), the controller 5 stores the signal value obtained from the detection signal in step S105. The signal value stored in step S105 corresponds to the signal value DA of a detection signal obtained when the indicator F has not yet pressed the touch surface 1T (scene SC2) in FIG. 6.

In step S107, the controller 5 obtains the signal value from the detection signal output from the pressing force detection electrode FRx. In step S109, the controller 5 then calculates the amount of change between this signal value and the signal value DA. If the calculated amount of change is larger than or equal to a prestored threshold for the amount of change in the pressing force (YES in step S111), the controller 5 detects the pressing force of the indicator F in step S113. In step S115, the controller 5 calculates the value of the pressing force from the amount of change.

In the touch panel 1 according to the first embodiment, the drive electrode Tx and the pressing force detection electrode FRx are disposed to face the conductor (black matrix electrode 212A) with the liquid crystal layer 30 therebetween. With this arrangement, the distance from the drive electrode Tx and the pressing force detection electrode FRx to the black matrix electrode 212A can be made sufficiently smaller than the distance H3 from the drive electrode Tx and the pressing force detection electrode FRx to the touch surface 1T. Hence, the amount of change in a detection signal output from the pressing force detection electrode FRx resulting from the indicator F touching the touch surface 1T can be made sufficiently smaller than the amount of change in the detection signal resulting from the pressing force of the indicator F. The signal value of the detection signal is thus less likely to be influenced by the indicator F touching the touch surface 1T. In the touch panel system 1A according to the first embodiment, the pressing force can be detected efficiently, based on the amount of change ΔD(=DB−DA) between the signal value DA of a detection signal obtained when the indicator F has not yet pressed the touch surface 1T (scene SC2) and the signal value DB of the detection signal obtained when the indicator F is pressing the touch surface 1T (scene SC3). Additionally, as well as obtaining the pressing force based on the detection signal output from the pressing force detection electrode FRx, the position of the indicator F touching the touch surface 1T can also be detected based on a detection signal output from the position detection electrode Rx.

In the touch panel 1 according to the first embodiment, the area of the pressing force detection electrode FRx is smaller than that of the position detection electrode Rx. For example, in FIG. 2, when the drive electrode Tx positioned in the middle portion of the electrode layer 17 in the y-axis direction applies a drive signal, the area Af of the pressing force detection electrode FRx is smaller than the area Ar of the adjacent position detection electrode Rx. In other words, the area Ar of the position detection electrode Rx is larger than the area Af of the pressing force detection electrode FRx. The reason for this is that, for example, the size of the pressing force detection electrode FRx in the x-axis direction is smaller than that of the position detection electrode Rx. Hence, because of the large area, the position detection electrode Rx can detect that the indicator F is touching the touch surface 1T with high accuracy, while, because of the small area, the pressing force detection electrode FRx can regulate variations in the capacitance resulting from a change in the contact area of the indicator F and detect the pressing force of the indicator F with high accuracy.

Second Embodiment

Figure 8:
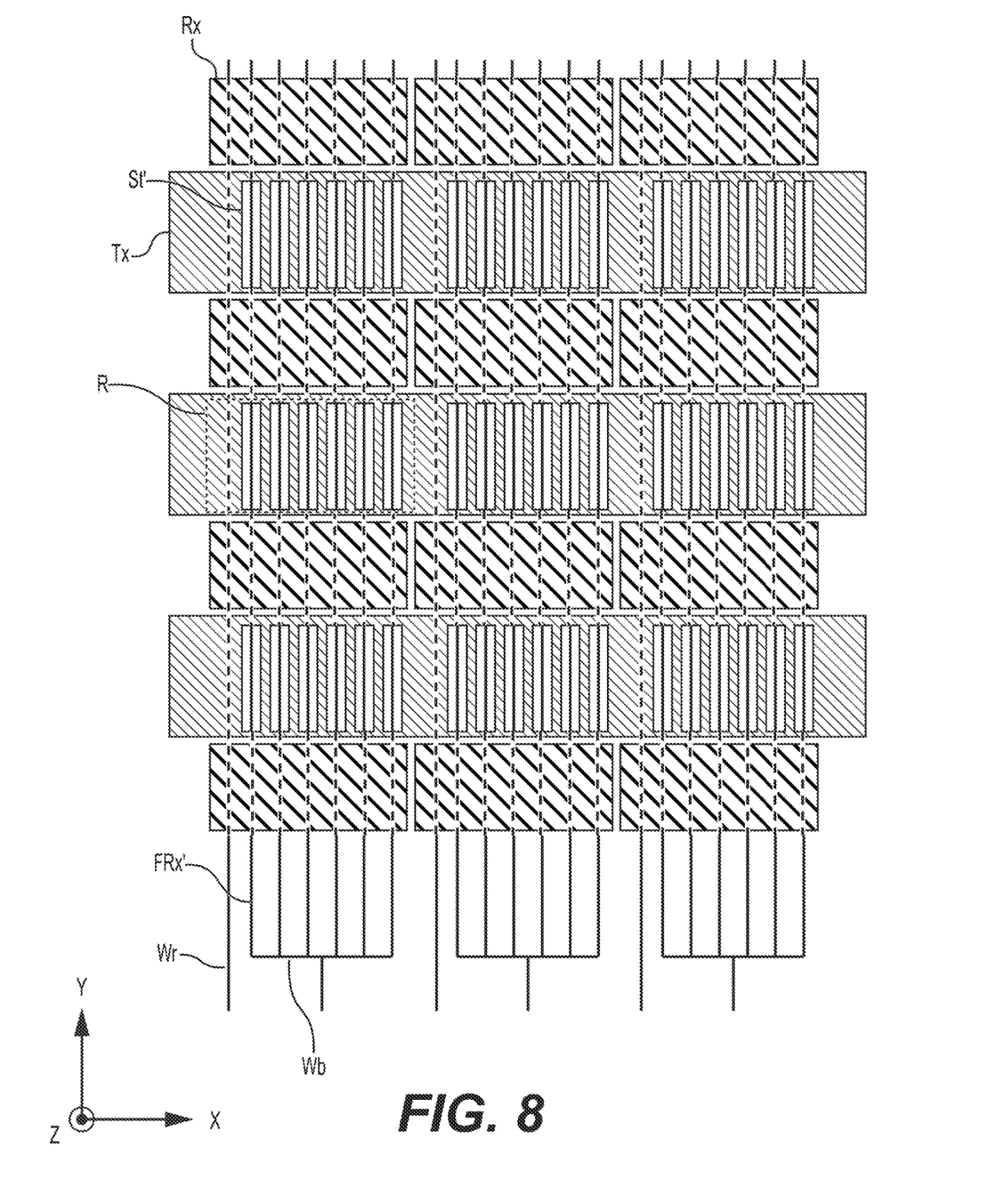
FIG. 8 is a schematic plan view of an electrode layer of a touch panel according to a second embodiment.
Figure 9:
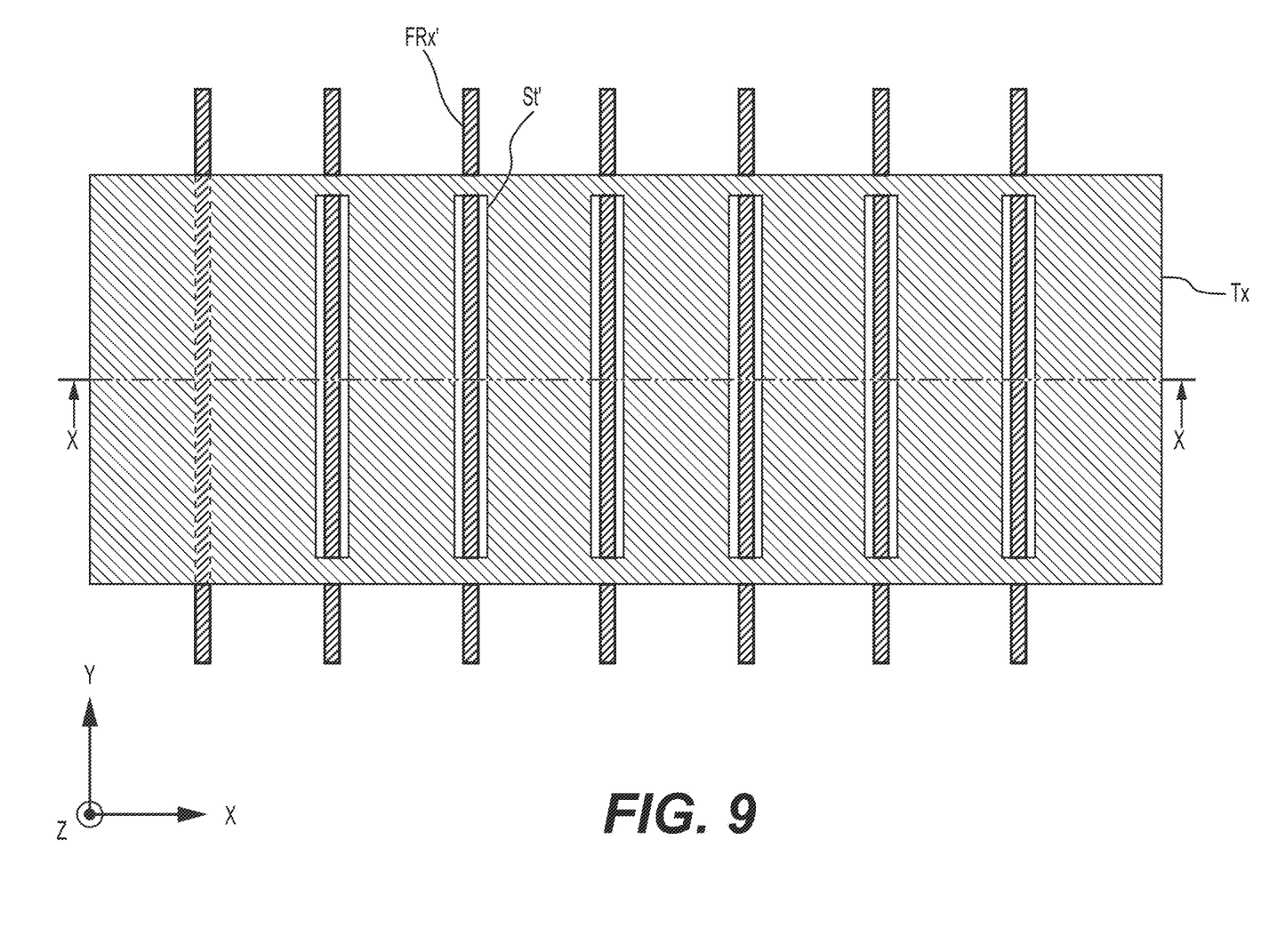
FIG. 9 is a schematic enlarged view of a portion R in FIG. 8.
Figure 10:
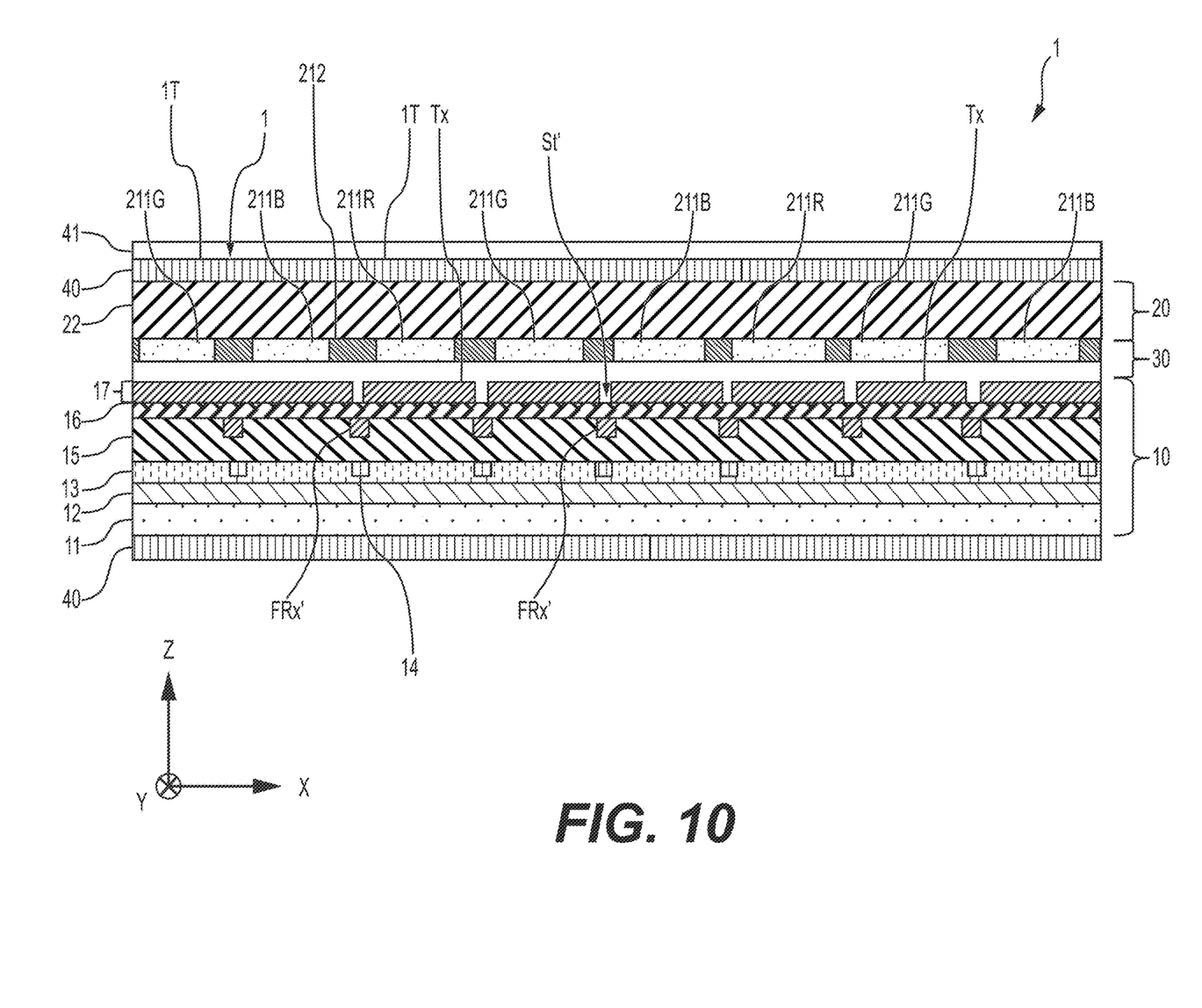
FIG. 10 is a schematic sectional view taken along line X-X in FIG. 9.

FIG. 8 is a schematic plan view of an electrode layer 17 of a touch panel 1 according to a second embodiment. FIG. 9 is a schematic enlarged view of a portion R in FIG. 8. FIG. 10 is a schematic sectional view taken along line X-X in FIG. 9. In the touch panel 1 of the second embodiment, plural position detection electrodes Rx and pressing force detection electrodes FRx are formed on the same wiring layer.

In the touch panel 1 according to the second embodiment, plural pressing force detection electrodes FRx' are located at a height different from the position detection electrodes Rx and the drive electrodes Tx. In other words, the second embodiment is different from the first embodiment in that the plural pressing force detection electrodes FRx' are formed by a metal layer different from that forming the position detection electrodes Rx and the drive electrodes Tx.

Multiple slits St' extending in the y-axis direction are formed in the drive electrode Tx. The interval between the slits St' is equal to the pixel pitch in the x-axis direction, for example. The multiple slits St' overlap corresponding black matrix electrodes 212A as viewed from above. The slits St' do not reach a pair of sides of the drive electrode Tx in the y-axis direction and are thus isolated openings. With this arrangement, the drive electrode Tx is not divided and becomes continuous in the x-axis direction.

It is suitable that, as viewed from above, the slits St' are not disposed to overlap wiring Wr used for connecting the position detection electrodes Rx. If the slits St' are disposed to overlap the wiring Wr, fringe capacitance is formed between the wiring Wr and the drive electrode Tx, and a change in the fringe capacitance resulting from an indicator pressing the touch surface 1T may influence a position detection signal.

The pressing force detection electrodes FRx' are located under the insulating layer 16 and extend in the y-axis direction. That is, the insulating layer 16 is disposed between the pressing force detection electrodes FRx' and the drive electrodes Tx and position detection electrodes Rx. The pressing force detection electrodes FRx' are located on a level different from that of the position detection electrodes Rx and the drive electrodes Tx.

Each pressing force detection electrode FRx' is disposed to overlap the corresponding slit St' and black matrix electrode 212 as viewed from above.

The size of the pressing force detection electrode FRx' in the x-axis direction is smaller than the pixel pitch in the x-axis direction and may be smaller than or equal to the size of the black matrix electrode 212 in the x-axis direction, for example.

As illustrated in FIG. 8, among the plural pressing force detection electrodes FRx' arranged in the x-axis direction, two or more pressing force detection electrodes FRx' are connected to each other by wiring Wb. In the example in FIG. 8, six pressing force detection electrodes FRx' are connected to each other by the wiring Wb.

In the second embodiment, plural pressing force detection electrodes FRx' are integrated with each other. This can increase the amount of change in the signal value of a detection signal generated by a capacitance change resulting from an indicator pressing the touch panel 1. It is thus possible to detect the pressing force of the indicator and to measure the magnitude of the pressing force with higher accuracy.

The size of the pressing force detection electrodes FRx' in the x-axis direction can be made small and the pressing force detection electrodes FRx' are disposed below the drive electrodes Tx. With this arrangement, the pressing force detection electrodes FRx' are less vulnerable to capacitance variations caused by an indicator contacting the touch surface 1T and a change in the contact area. This enables the pressing force detection electrodes FRx' to detect the pressing force efficiently.

In the second embodiment, six pressing force detection electrodes FRx' are connected to each other by the wiring Wb. However, less than six or more than six pressing force detection electrodes FRx' may be connected to each other. The pressing force detection electrodes FRx' are located under the respective black matrix electrodes 212 between the corresponding color resists of the color filter. However, the number of pressing force detection electrodes FRx' may be reduced. For example, the pressing force detection electrode FRx' may be provided for every three pixels in the x-axis direction. In this case, the black matrix electrodes 212 which do not have a pressing force detection electrode FRx' may be non-conductive black matrix electrodes.

Third Embodiment

Figure 11:
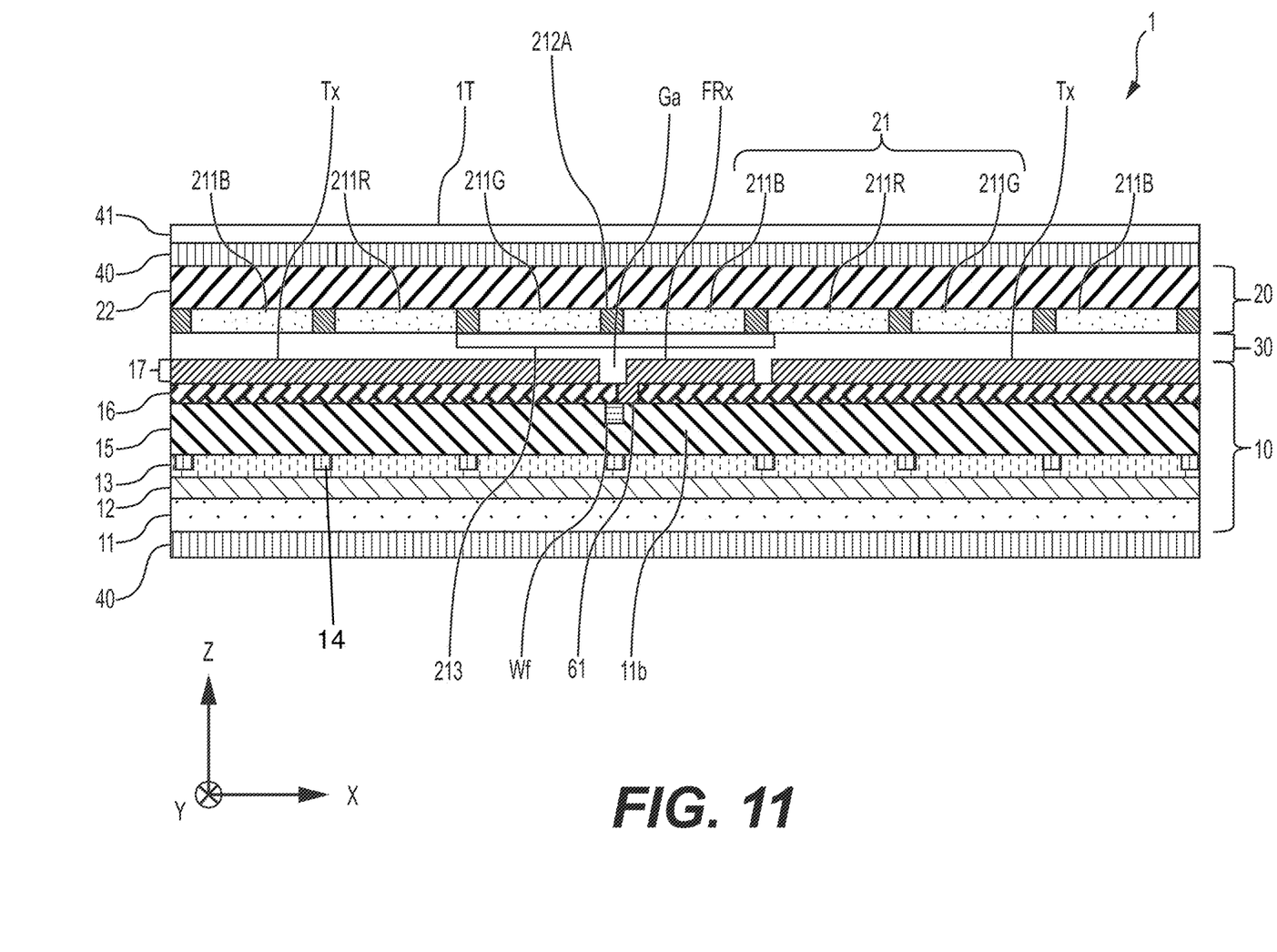
FIG. 11 is a schematic sectional view of a touch panel according to a third embodiment.

FIG. 11 is a schematic sectional view of a touch panel 1 according to a third embodiment. The touch panel 1 of the third embodiment includes a transparent electrode 213, such as an ITO electrode. The transparent electrode 213 is connected to black matrix electrodes 212A. The transparent electrode 213 is disposed on the color resists 211 of the color filter 21. The width of the transparent electrode 213 in the x-axis direction is larger than the width of the black matrix electrode 212A in a first direction. The width of the transparent electrode 213 may suitably be larger than the width of the color resist 211 in the first direction.

As viewed from above, the transparent electrode 213 may cover at least part of the pressing force detection electrode FRx or may cover the entirety of the pressing force detection electrode FRx.

In the third embodiment, the transparent electrode 213 connected to the black matrix electrodes 212A covers at least part of the pressing force detection electrode FRx as viewed from above. The transparent electrode 213 thus serves as a shield and makes it less likely to cause a capacitance change resulting from an indicator touching the touch surface 1F to be reflected in the detection result of the pressing force detection electrode FRx. In a manner similar to the first embodiment, the distance from the drive electrode Tx and pressing force detection electrode FRx to the black matrix electrode 212A and the transparent electrode 213 is changed by the indicator pressing the touch surface 1T, so that the pressing force detection electrode FRx can detect a change in the fringe capacitance. It is thus possible to reduce the influence of the capacitance variations caused by the indicator contacting the touch surface 1T and a change in the contact area. As a result, the pressing force detection electrodes FRx can detect the pressing force with high accuracy.

The third embodiment can be effectively used especially for a touch panel 1 having a large pixel size. With a large pixel size, the size of the pressing force detection electrode FRx in the x-axis direction also becomes large (50 µm or larger, for example), and the area of the pressing force detection electrode FRx accordingly becomes large. This increases the influence of a capacitance change caused by an indicator touching the touch surface 1F. In the third embodiment, however, the transparent electrode 213 can effectively regulate the influence of a capacitance change.

OTHER EMBODIMENTS

A touch panel system and an electronic device according to the present disclosure are not limited to the above-described embodiments and may be modified variously. For example, the shapes of the drive electrode, position detection electrode, pressing force detection electrode are only examples and may be formed in different shapes. In the above-described embodiments, the counter electrode (common electrode) used for applying an electric field to the liquid crystal layer is provided on the active matrix substrate and also serves as the drive electrodes, position detection electrodes, and pressing force detection electrodes. However, the counter electrode may be provided on the color filter substrate. In this case, drive electrodes, position detection electrodes, and pressing force detection electrodes are separately provided on the active matrix substrate.

A touch panel system and an electronic device according to an embodiment of the disclosure may be configured as follows.

A touch panel system according to a first configuration of the disclosure includes a touch panel and a controller. The touch panel includes an active matrix substrate, a color filter substrate, and a liquid crystal layer located between the active matrix substrate and the color filter substrate. The active matrix substrate includes a drive electrode and a detection electrode. The drive electrode and the detection electrode are disposed on a surface of the active matrix substrate which faces the liquid crystal layer. The color filter substrate includes a conductor. The conductor is disposed on a surface of the color filter substrate which faces the liquid crystal layer. The controller is configured to supply a drive signal to the drive electrode and obtain a signal value from the detection electrode and to detect a pressing force applied to the touch panel by an indicator, based on the signal value obtained from the detection electrode.

According to the first configuration, the conductor is located on the color filter substrate. With this arrangement, the distance from the drive electrode and the detection electrode to the conductor is changed as a result of the indicator pressing the touch panel, thereby efficiently detecting the pressing force.

According to a second configuration, the controller may be configured to also calculate the magnitude of the pressing force based on an amount of change in the signal value.

According to a third configuration, the detection electrode may include a position detection electrode and a pressing force detection electrode. The pressing force detection electrode is disposed adjacent to the drive electrode. The conductor may be located to overlap or match a boundary region between the drive electrode and the pressing force detection electrode as viewed from above. The controller may be configured to detect the pressing force based on a signal value obtained from the pressing force detection electrode. With this configuration, the pressing force detection electrode can detect a change in the fringe capacitance generated between the pressing force detection electrode and the drive electrode, thereby detecting the pressing force efficiently.

According to a fourth configuration, the controller may be configured to also detect a position of the indicator touching the touch panel, based on a signal value obtained from the position detection electrode.

According to a fifth configuration, the area of the pressing force detection electrode may be smaller than the area of the position detection electrode.

According to a sixth configuration, the color filter substrate may further include a color filter and a black matrix. The color filter includes plural resists having different colors. The color filter is disposed on a surface of the color filter substrate which faces the liquid crystal layer. The black matrix is disposed at a boundary between the plural resists. The conductor may form at least part of the black matrix.

According to a seventh configuration, the color filter substrate may further include a transparent electrode that is connected to the conductor and that is disposed on the color filter. The transparent electrode may cover at least part of the pressing force detection electrode as viewed from above.

According to an eighth configuration, the conductor may be connected to a reference potential.

An electronic device according to a ninth configuration includes the touch panel system according to one of the first through eighth configurations.

The present disclosure contains subject matter related to that disclosed in Japanese Priority Patent Application JP 2023-183583 filed in the Japan Patent Office on Oct. 25, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A touch panel system comprising:
a touch panel; and
a controller,
the touch panel including
an active matrix substrate,
a color filter substrate, and
a liquid crystal layer located between the active matrix substrate and the color filter substrate, wherein
the active matrix substrate includes a drive electrode and a detection electrode, the drive electrode and the detection electrode being disposed on a surface of the active matrix substrate which faces the liquid crystal layer,
the color filter substrate includes a conductor, the conductor being disposed on a surface of the color filter substrate which faces the liquid crystal layer, and
the controller is configured to
supply a drive signal to the drive electrode and obtain a signal value from the detection electrode, and
detect a pressing force applied to the touch panel by an indicator, based on the signal value obtained from the detection electrode.

2. The touch panel system according to claim 1, wherein the controller is configured to also calculate magnitude of the pressing force based on an amount of change in the signal value.

3. The touch panel system according to claim 1, wherein:
the detection electrode includes a position detection electrode and a pressing force detection electrode, the pressing force detection electrode being disposed adjacent to the drive electrode;
the conductor is located to overlap or match a boundary region between the drive electrode and the pressing force detection electrode as viewed from above; and
the controller is configured to detect the pressing force based on a signal value obtained from the pressing force detection electrode.

4. The touch panel system according to claim 3, wherein the controller is configured to also detect a position of the indicator touching the touch panel, based on a signal value obtained from the position detection electrode.

5. The touch panel system according to claim 3, wherein an area of the pressing force detection electrode is smaller than an area of the position detection electrode.

6. The touch panel system according to claim 3, wherein:
the color filter substrate further includes
a color filter including a plurality of resists having different colors, the color filter being disposed on a surface of the color filter substrate which faces the liquid crystal layer, and
a black matrix disposed at a boundary between the plurality of resists; and
the conductor forms at least part of the black matrix.

7. The touch panel system according to claim 6, wherein:
the color filter substrate further includes a transparent electrode that is connected to the conductor and that is disposed on the color filter; and
the transparent electrode covers at least part of the pressing force detection electrode as viewed from above.

8. The touch panel system according to claim 1, wherein the conductor is connected to a reference potential.

9. An electronic device comprising:
the touch panel system according to claim 1.

* * * * *